United States Patent
Matsuzaki et al.

(10) Patent No.: US 12,403,593 B2
(45) Date of Patent: Sep. 2, 2025

(54) MODEL PARAMETER LEARNING METHOD

(71) Applicant: HONDA MOTOR CO., LTD., Tokyo (JP)

(72) Inventors: Sango Matsuzaki, Saitama (JP); Shinta Aonuma, Saitama (JP); Yuji Hasegawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 277 days.

(21) Appl. No.: 18/042,844

(22) PCT Filed: Apr. 30, 2021

(86) PCT No.: PCT/JP2021/017209
§ 371 (c)(1),
(2) Date: Feb. 24, 2023

(87) PCT Pub. No.: WO2022/044429
PCT Pub. Date: Mar. 3, 2022

(65) Prior Publication Data
US 2023/0294279 A1 Sep. 21, 2023

(30) Foreign Application Priority Data
Aug. 27, 2020 (JP) .................................. 2020-143979

(51) Int. Cl.
*B25J 9/16* (2006.01)
*G05D 1/65* (2024.01)
(Continued)

(52) U.S. Cl.
CPC ............. *B25J 9/163* (2013.01); *B25J 9/1664* (2013.01); *G05D 1/65* (2024.01);
(Continued)

(58) Field of Classification Search
CPC .......... B25J 9/163; B25J 9/1664; G05D 1/65; G05D 2101/15; G05D 1/0221;
(Continued)

(56) References Cited

U.S. PATENT DOCUMENTS

| 11,989,020 B1 * | 5/2024 | Bagnell .................. G06N 3/045 |
| 2010/0222925 A1 | 9/2010 | Anezaki |
| 2016/0188977 A1 * | 6/2016 | Kearns .................. B25J 11/002 |
| | | 348/113 |

FOREIGN PATENT DOCUMENTS

| JP | 2006-185438 A | 7/2006 |
| JP | 2013-103320 A | 5/2013 |
| JP | 2019-036192 A | 3/2019 |

OTHER PUBLICATIONS

Hamandi, M., et al., "DeepMoTIon: Learning to Navigate Like Humans", Oct. 2019, IEEE, 2019 28th IEEE International Conference on Robot and Human Interactive Communication (RO-MAN), pp. 1-7 (Year: 2019).*

(Continued)

*Primary Examiner* — Abby Y Lin
*Assistant Examiner* — Karston G. Evans
(74) *Attorney, Agent, or Firm* — Rankin, Hill & Clark LLP (57) ABSTRACT

Provided is a model parameter learning method by which a model parameter of a learning model used in control of a moving body having movement constraints can be appropriately learned. In this model parameter learning method, a model prediction control algorithm reflecting movement constraints of a robot 1 is used to calculate a time series of learning speed commands such that the movement trajectory of the robot 1 tracks the time series of a movement trajectory of a first pedestrian 5; and a model parameter of a CNN model is learned by an error back propagation method, the CNN model using learning data including the learning speed (Continued)

commands time series as input and outputting a time series of speed commands for a first moving body.

4 Claims, 10 Drawing Sheets

(51) Int. Cl.
  *G05D 101/15* (2024.01)
  *G06N 20/00* (2019.01)
(52) U.S. Cl.
  CPC ........... *G05B 2219/36184* (2013.01); *G05B 2219/40116* (2013.01); *G05B 2219/40391* (2013.01); *G05D 2101/15* (2024.01); *G06N 20/00* (2019.01)
(58) Field of Classification Search
  CPC .......... G05B 2219/36184; G05B 2219/40116; G05B 2219/40391; G06N 20/00
  See application file for complete search history.

(56) References Cited

OTHER PUBLICATIONS

Henry, P., et al., "Learning to Navigate Through Crowded Environments", May 2010, IEEE, 2010 IEEE International Conference on Robotics and Automation Anchorage Convention District, pp. 981-986 (Year: 2010).*
Kuderer, M., et al., "Teaching Mobile Robots to Cooperatively Navigate in Populated Environments", Nov. 2013, IEEE, 2013 IEEE/RSJ International Conference on Intelligent Robots and Systems (IROS), pp. 3138-3143 (Year: 2013).*
The Japan Society of Mechanical Engineers, Jun. 5, 2018, Sumiyoshi, Joichiro et al., Deep Learning from Demonstration for Motion Planning of Mobile Robot, Proceedings of 2018, JSME Annual Conference on Robotics and Mechatronics (Robomec), English abstract included, 3 pages.
International Search Report, Date of mailing: Jul. 6, 2021, 2 pages.

* cited by examiner

S1 — Model Parameter Learning Step

Learn a model parameter of a learning model and output a time series of speed commands of a robot

S2 — Movement Trajectory Control Step

Cause a learning device to learn the model parameter of the learning model used for control of the movement trajectory of the robot such that the robot having a movement constraint moves on the movement trajectory obtained by imitating a movement trajectory of a pedestrian having a movement constraint different from the robot

FIG. 14

MODEL PARAMETER LEARNING METHOD

TECHNICAL FIELD

The present invention relates to a model parameter learning method for learning a model parameter of a learning model used for control of a movement trajectory of a moving body.

BACKGROUND ART

Conventionally, as a model parameter learning method for learning a model parameter of a learning model, a method described in Patent Literature 1 is known. This learning model is for control of a movement trajectory of a mobile robot to track a movement trajectory of a behavior trainer, and uses relative speeds of a surrounding pedestrian with respect to the current position and the mobile robot (speeds and traveling direction), and the current position as input, and outputs speed commands to the mobile robot.

In this learning method, model parameters of the learning model are learned using, as learning data, relative speed information of a behavior trainer with respect to a pedestrian surrounding the behavior trainer (speeds and traveling direction), and the like, in addition to the current position of the behavior trainer, the destination position, and the speeds. In this case, a neural network or the like is used as a learning model, and a pedestrian or a mobile robot is used as a behavior trainer. Furthermore, the above learning data is acquired by a sensor attached to the behavior trainer.

CITATION LIST

Patent Literature

Patent Literature 1: JP 2019-36192 A

SUMMARY OF INVENTION

Technical Problem

According to the above conventional model parameter learning method, in a case where a pedestrian is used as a behavior trainer, the following issues occur. That is, in a case where a pedestrian is used as a behavior trainer, because movement constraints of a mobile robot and the pedestrian are different from each other due to a difference in the degree of freedom of movement between the mobile robot and the pedestrian, movement data of the pedestrian that cannot be performed by the mobile robot is learned in learning of model parameters of a learning model. As a result, in a case where a movement trajectory of the mobile robot is controlled using the learning model, the mobile robot cannot appropriately move in a crowd, and controllability is deteriorated.

Furthermore, according to the above model parameter learning method, in a case where a continuous value such as speeds of a pedestrian is used as learning data, convergence of learning may be deteriorated, and in the worst case, learning of the model parameters may not converge. As a result, a learning model cannot be obtained, and a movement trajectory of a mobile robot cannot be controlled. The above issues occur not only in the mobile robot but also in a case where model parameters of a learning model are learned using a movement trajectory of one moving body as learning data among two moving bodies having different movement constraints.

The present invention has been made to solve the above issues, and an object thereof is to provide a model parameter learning method that enables appropriate learning of a model parameter of a learning model used for control of a moving body having movement constraints and improving convergence of learning.

Solution to Problem

In order to achieve the above object, an invention according to claim 1 is a model parameter learning method for causing a learning device to learn a model parameter of a learning model used for control of a movement trajectory of a first moving body such that the first moving body having a movement constraint moves on the movement trajectory obtained by imitating a movement trajectory of a second moving body having a movement constraint different from the first moving body, the method performed by the learning device, including an acquisition step of acquiring a time series of surrounding environment information of the second moving body and a time series of the moving trajectory of the second moving body synchronized with the time series of the surrounding environment information of the second moving body, a calculation step of calculating a time series of learning speed commands of the first moving body using a model prediction control algorithm based on a model reflecting a movement constraint of the first moving body such that a time series of the movement trajectory of the first moving body tracks a time series of the movement trajectory of the second moving body acquired in the acquisition step, and a learning step of learning, by a predetermined machine learning algorithm, the model parameter of the learning model in which data including a time series of learning speed commands of the first moving body and a time series of the surrounding environment information of the second moving body is input and a time series of speed commands of the first moving body is output.

According to this model parameter learning method, in the calculation step, since the time series of the learning speed commands of the first moving body is calculated using the model prediction control algorithm based on the model reflecting the movement constraint of the first moving body such that the time series of the movement trajectory of the first moving body tracks the time series of the movement trajectory of the second moving body acquired in the acquisition step, the time series of the learning speed commands of the first moving body can be calculated as a value by which the time series of the movement trajectory of the second moving body can be tracked within the movement constraint of the first moving body. As a result, in the learning step, the model parameter of the learning model in which the data including the time series of the learning speed commands of the first moving body and the surrounding environment information of the first moving body is input and the time series of the speed commands of the first moving body is output is learned by the predetermined machine learning algorithm, so that the model parameter of the learning model can be appropriately learned in a state in which the movement constraint of the first moving body is reflected. As a result, in a case where the movement trajectory of the first moving body is controlled using the speed commands of the first moving body that are output of the learning model, the first moving body can be controlled to move on the movement trajectory obtained by imitating the movement trajectory of the second moving body while reflecting the movement constraint of the first moving body. Note that the "time series of the movement trajectory of the second moving body synchronized with the time series of the surrounding environment information of the second moving body" in the present specification means that the time series of the surrounding environment information of the second moving body and the time series of the movement trajectory of the second moving body are acquired at the same timing.

An invention according to claim 2 is the model parameter learning method according to claim 1, in which, in the calculation step, a time series of the learning speed commands of the first moving body is calculated as discrete values.

According to this model parameter learning method, in a learning speed command calculation step, the learning speed commands of the first moving body are calculated as discrete values, so that the discrete values can be used as teacher data. As a result, convergence of learning can be improved as compared with a case where a continuous value is used as teacher data.

An invention according to claim 3 is the model parameter learning method according to claim 1 or 2, in which, in the acquisition step, the movement trajectory of the second moving body is acquired in a state in which the movement trajectory of the second moving body that does not satisfy the movement constraint of the first moving body is deleted.

According to this model parameter learning method, since the movement trajectory of the second moving body is acquired in a state in which the movement trajectory of the second moving body that does not satisfy the movement constraint of the first moving body is deleted, the learning speed commands of the first moving body can be calculated as appropriately satisfying the movement constraint of the first moving body.

DESCRIPTION OF EMBODIMENTS

Hereinafter, a model parameter learning method according to one embodiment of the present invention will be described with reference to the drawings. The model parameter learning method of the present embodiment is to learn a learning model used for movement control of a robot 1 illustrated in FIG. 1. Note that, in the present embodiment, the robot 1 corresponds to a first moving body.

Figure 1:
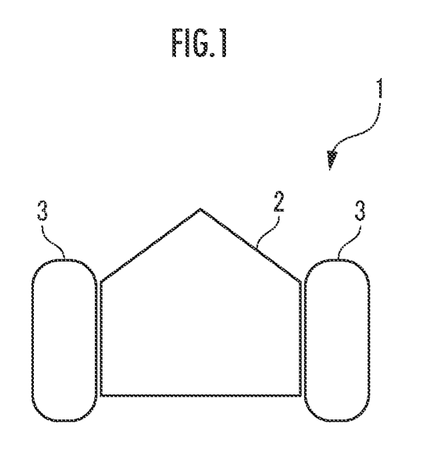
FIG. 1 is a plan view schematically illustrating a configuration of a robot according to one embodiment of the present invention.

The robot 1 is of an autonomous mobile type, and includes a main body 2, left and right drive wheels 3 and 3 arranged on left and right sides of the main body 2, two actuators 4 and 4 (see FIG. 2), and the like as illustrated in FIG. 1. These actuators 4 and 4 are formed using electric motors, and are electrically connected to a control device 10 described below. When the robot 1 moves, the left and right drive wheels 3 and 3 are driven independently of each other by the control device 10 controlling the actuators 4 and 4.

Figure 2:
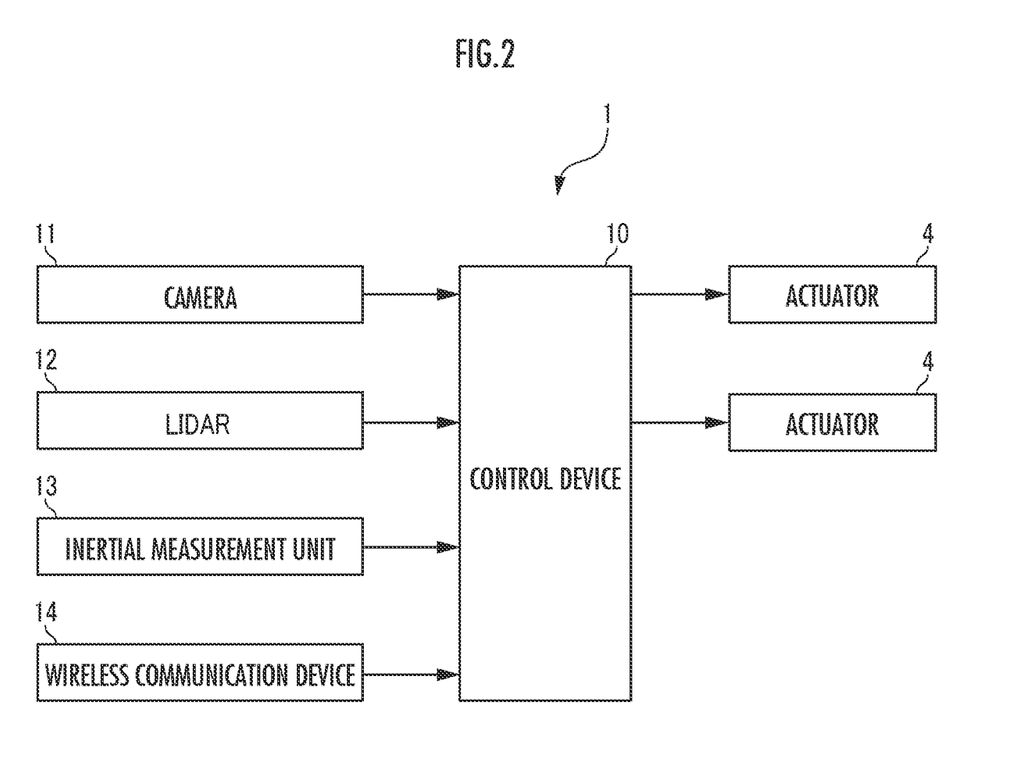
FIG. 2 is a block diagram illustrating an electrical configuration of the robot.

Next, an electrical configuration of the robot 1 will be described. As illustrated in FIG. 2, the robot 1 further includes the control device 10, a camera 11, a light detection and ranging (LIDAR) 12, an inertial measurement unit 13, and a wireless communication device 14, and these components 10 to 14 are all incorporated in the main body 2.

The control device 10 includes a microcomputer including a CPU, a RAM, a ROM, an E2PROM, an I/O interface, various electric circuits (all not illustrated), and the like. In the E2PROM, a learning model for determining speed commands of the robot 1 is stored. In this case, a convolutional neural network (CNN) is used as the learning model, and the learning model in which model parameters of the CNN, that is, a weight of a connected layer and a bias term that have been sufficiently learned by a learning device 30 described below is stored.

The camera 11 images a surrounding environment robot 1 and outputs an image signal indicating the image to the control device 10. Furthermore, the LIDAR 12 measures, for example, a distance to an object in the surrounding environment using laser light, and outputs a measurement signal indicating the distance to the control device 10. Furthermore, the inertial measurement unit 13 detects a three-dimensional angular speed and acceleration of the robot 1, and outputs a detection signal indicating the three-dimensional angular speed and acceleration to the control device 10. Furthermore, the control device 10 acquires a destination from a server (not illustrated) via the wireless communication device 14.

The control device 10 calculates speed commands using the CNN in which the model parameters have been learned as described above on the basis of the image signal of the camera 11, the measurement signal of the LIDAR 12, and the detection signal of the inertial measurement unit 13, and controls a movement trajectory of the robot 1. These speed commands are calculated as a vector including two speeds v and ω described below as elements.

Next, the principle of a model learning method of the present embodiment will be described. First, the learning device 30 illustrated in FIG. 3 will be described. The learning device 30 is for learning the model parameters of the CNN described below (weight of the connected layer and bias term) in order to make a movement trajectory of the robot 1 track a movement trajectory of a pedestrian, and includes a LIDAR 33, a various types of information acquisition unit 34, a learning data creation unit 35, and a CNN learning unit 36. Specifically, these elements 34 to 36 are implemented by a controller (not illustrated) or the like.

Figure 5:
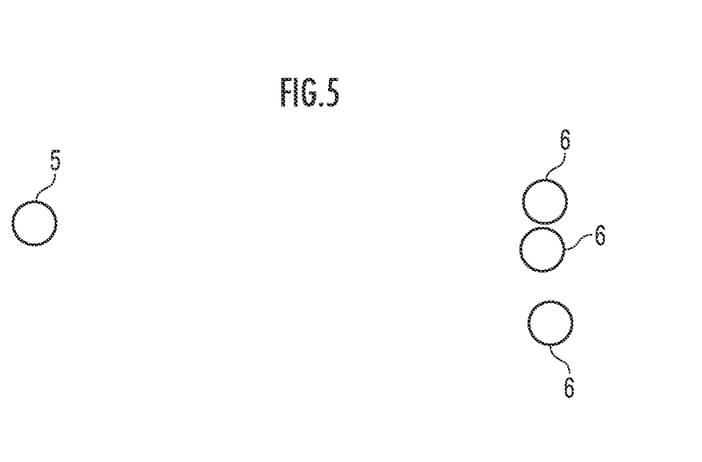
FIG. 5 is a plan view illustrating a positional relationship of pedestrians before acquisition of movement trajectories.

First, in order to learn a movement trajectory of a general pedestrian, as illustrated in FIG. 5, a pedestrian 5 is set as a reference first pedestrian 5, and in a case where the first pedestrian 5 travels in the right direction in FIG. 5, a traffic environment of a crowd in which a plurality of second pedestrians 6 is present in irregular arrangement in front is set. FIG. 5 is a plan view of a positional relationship between the first pedestrian 5 and the second pedestrians 6. Note that, in the present embodiment, the first pedestrian 5 corresponds to a second moving body.

Figure 6:
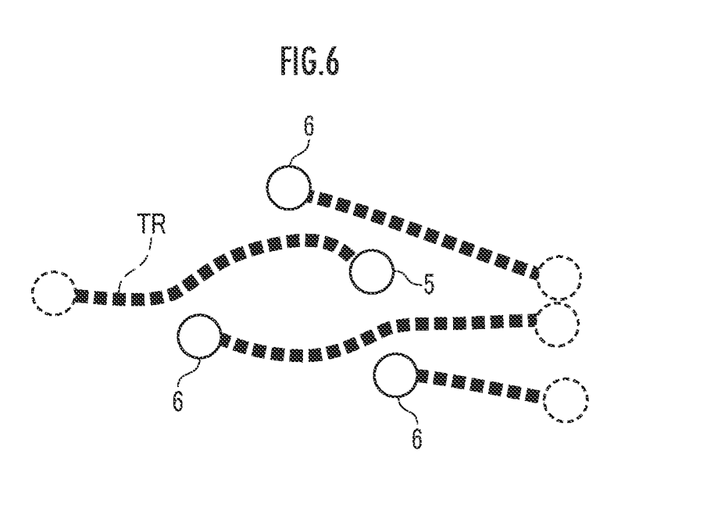
FIG. 6 is a plan view illustrating the movement trajectories when the pedestrians walk from positions illustrated in FIG. 5.

Next, by the LIDAR 33, a change in position when the first pedestrian 5 actually walks from a position illustrated in FIG. 5 to a position illustrated in FIG. 6 and changes in positions when the plurality of second pedestrians 6 actually walk are measured, and the measurement results are input to the various types of information acquisition unit 34.

Then, as illustrated in FIG. 6, the various types of information acquisition unit 34 sequentially samples (acquires) a movement trajectory TR of the first pedestrian 5 on the basis of the measurement results of the LIDAR 33. In this case, as the movement trajectory TR of the first pedestrian 5, a movement trajectory TR that is considered not to satisfy the movement constraints of the robot 1 in view of operation characteristics of the robot 1 is not sampled and is deleted.

For example, in a case where the average moving speeds of the first pedestrian 5 are equal to or higher than the maximum speeds of the robot 1, or in a case where the first pedestrian 5 turns around or is unsteady, the movement trajectory TR of the first pedestrian 5 is not sampled. Note that, in the present embodiment, the acquisition of the movement trajectory TR of the first pedestrian 5 corresponds to acquisition of a time series of a movement trajectory of the second moving body in an acquisition step.

Furthermore, the movement, trajectory TR of the first pedestrian 5 is acquired as a two-dimensional x-y coordinate value in a case where an axis extending in a traveling direction of the first pedestrian 5 is defined as an x-axis and an axis orthogonal to the traveling direction of the first pedestrian 5 is defined as a y-axis. Note that, in the following description, the definition of the x-axis and the y-axis is the same as that in FIG. 5, and definition of a z-axis is an axis orthogonal to the x-axis and the y-axis.

Figure 7:
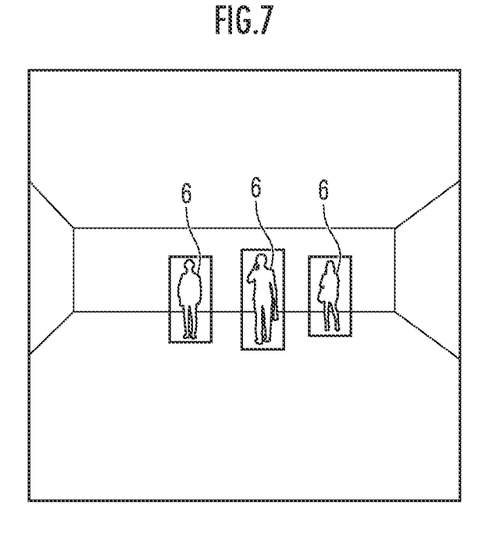
FIG. 7 is a diagram illustrating an example of a photographed image.
Figure 8:
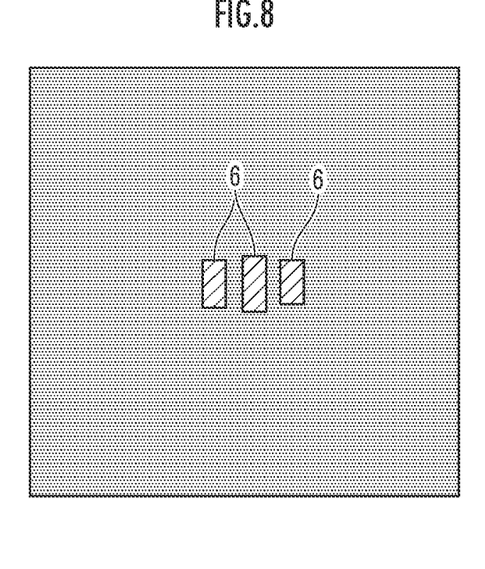
FIG. 8 is a diagram illustrating an example of a mask image.

Furthermore, the various types of information acquisition unit 34 creates a virtual image illustrated in FIG. 7 from a positional relationship of the plurality of second pedestrians 6 and the like on the basis of the measurement results of the LIDAR 33, and creates a mask image illustrated in FIG. 8 from the virtual image. The mask image of FIG. 8 is created in synchronization with acquisition timing of the movement trajectory TR of the first pedestrian 5. Note that, in the present embodiment, the acquisition of a time series of the mask image corresponds to acquisition of a time series of surrounding environment information of the second moving body.

Furthermore, the movement trajectory TR and the mask image acquired as described above are input from the various types of information acquisition unit 34 to the learning data creation unit 35. Accordingly, in the learning data creation unit 35, learning data is created on the basis of various types of information.

In this case, as the learning data, a time series of each of current speeds, a destination direction, a mask image, and learning speed commands is created. A time series of the destination direction is calculated on the basis of the position of the destination, the movement trajectory TR, and a time series of the mask image, and a time series of the current speeds is calculated by a state updating unit 35e described below.

Furthermore, the time series of the mask image is created by a single shot multibox detector (SSD) method on the basis of a time series of a photographed image. For example, in a case where a photographed image illustrated in FIG. 7 is sampled, the mask image illustrated in FIG. 8 is created. Note that, in the present embodiment, the acquisition of a time series of the mask image corresponds to acquisition of a time series of surrounding environment information of the second moving body.

Furthermore, a time series of the learning speed commands is calculated by the following method. First, the calculation principle of the learning speed commands will be described. As compared with a pedestrian M1, the robot 1 of the present embodiment has characteristics that the movement constraints are strict due to the structure of moving in accordance with rotation of the left and right drive wheels 3 and 3.

Figure 9:
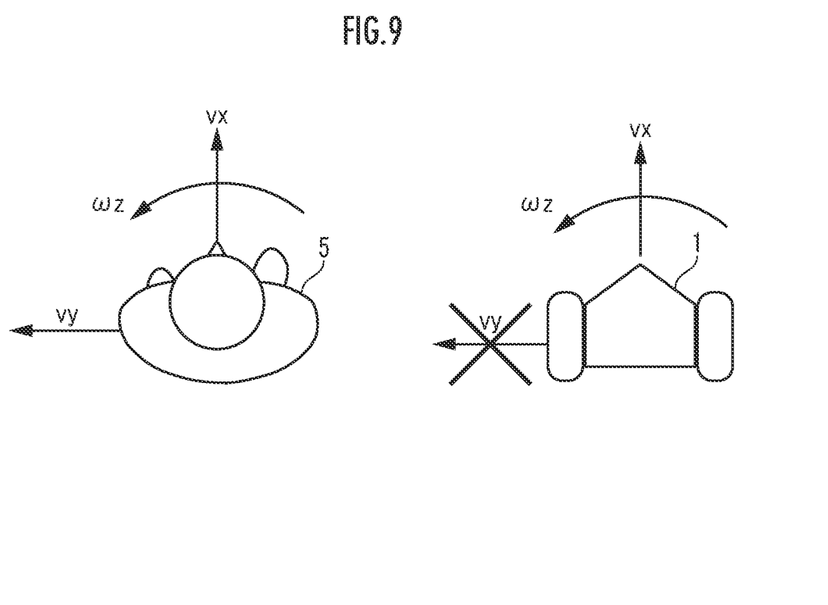
FIG. 9 is a diagram illustrating movement constraints of a robot and a pedestrian.

That is, as illustrated in FIG. 9, in a case where the pedestrian M1 moves in the x-axis direction at a translational speed vx or in a case where the pedestrian M1 rotates about the z-axis at an angular speed wz, the robot 1 can move in the x-axis direction or rotate about the z-axis so as to track the movement. On the other hand, in a case where the pedestrian M1 moves in the y-axis direction (lateral direction) at a translational speed vy, the robot 1 cannot move in this direction.

On the basis of such movement constraints of the robot 1, the learning data creation unit 35 according to the present embodiment calculates learning speed commands such that the movement trajectory of the robot 1 tracks the movement trajectory of the pedestrian M1 using a model predictive control (MPC) algorithm as described below. Note that, in the following description, the movement trajectory of the pedestrian M1 is referred to as a "reference trajectory", and each sampling point of the reference trajectory is referred to as a "reference point".

First, following Formulas (1) to (5) are obtained by deriving motion equations of a discrete time system of the robot 1 in consideration of the movement constraints of the robot 1.

[MATH. 1]
$$x_{k+1} = x_k + v_k \cos\theta_k dt \quad (1)$$

[MATH. 2]
$$y_{k+1} = y_k + v_k \sin\theta_k dt \quad (2)$$

[MATH. 3]
$$\theta_{k+1} = \theta_k + \omega_k dt \quad (3)$$

[MATH. 4]
$$v_{k+1} = u(v)_k \quad (4)$$

[MATH. 5]
$$\omega_{k+1} = u(\omega)_k \quad (5)$$

In above Formulas (1) to (5), a subscript k represents discrete time, and θ represents an angle of the traveling direction of the robot 1 with respect to the x-axis. Furthermore, dt represents a calculation period, v corresponds to the translational speed vx, and ω corresponds to the angular speed wz. Note that, in the present embodiment, Formulas (1) to (5) correspond to models reflecting the movement constraints of the first moving body.

Next, a state amount vectors and a speed command vector u are defined as in following Formulas (6) and (7).

[MATH. 6]

$$s=[x,y,\theta,v,\omega]^T \quad (6)$$

[MATH. 7]

$$u=[u(v),u(\omega)]^T \quad (7)$$

Furthermore, a state amount difference vector s~ (~ is expressed above s in a formula) and a speed command difference vector u~ (~ is expressed above u in a formula) are defined as in following Formulas (8) and (9).

[MATH. 8]

$$\tilde{s}=s-s_r \quad (8)$$

[MATH. 9]

$$\tilde{u}=u-u_r \quad (9)$$

In above Formula (8), $s_r$ is a state amount vector of a reference point, and $u_r$ is a speed command vector of a reference point. These values $s_r$ and $u_r$ are calculated on the basis of various types of information of the first pedestrian 5 (movement trajectory TR, translational speed vx, and angular speed ωz) acquired by the various types of information acquisition unit 34 described above.

On the basis of above Formulas (8) and (9), following Formulas (10) to (12) are obtained by assuming that an error is minute at a reference point, that is, an acquisition point of various types of information of the first pedestrian 5, and deriving error models using Taylor expansion.

[MATH. 10]

$$\tilde{s}_{k+1}=A_k\tilde{s}_k+B_k\tilde{u}_k \quad (10)$$

[MATH. 11]

$$A_k = \begin{bmatrix} 1 & 0 & -v_r\sin\theta_r dt & \cos\theta_{r,k} dt & 0 \\ 0 & 1 & v_r\cos\theta_r dt & \sin\theta_{r,k} dt & 0 \\ 0 & 0 & 1 & 0 & 0 \\ 0 & 0 & 0 & 0 & 0 \\ 0 & 0 & 0 & 0 & 0 \end{bmatrix} \quad (11)$$

[MATH. 12]

$$B_k = \begin{bmatrix} 0 & 0 \\ 0 & 0 \\ 0 & dt \\ 1 & 0 \\ 0 & 1 \end{bmatrix} \quad (12)$$

On the other hand, when Formulas (1) and (2) described above are used as state equations of the state amount vector $s_r$ of a reference point, following Formulas (13) and (14) are obtained.

[MATH. 13]

$$x_{r,k+1}=x_{r,k}+v_{r,k}\cos\theta_{r,k}dt \quad (13)$$

[MATH. 14]

$$y_{r,k+1}=y_{r,k}+v_{r,k}\sin\theta_{r,k}dt \quad (14)$$

In a case where Formulas (1) and (2) described above are Taylor expanded around a reference point and up to first-order approximation is performed, following Formulas (15) and (16) are obtained.

[MATH. 15]

$$x_{k+1}=x_{r,k}+v_{r,k}\cos\theta_{r,k}dt+(x_k-x_{r,k})-(\theta_k-\theta_{r,k})v_{r,k}\sin\theta_{r,k}dt+(v_k-v_{r,k})\cos\theta_{r,k}dt=x_{r,k+1}+(x_k-x_{r,k})-(\theta_k-\theta_{r,k})v_{r,k}\sin\theta_{r,k}dt+(v_k-v_{r,k})\cos\theta_{r,k}dt \quad (15)$$

[MATH. 16]

$$y_{k+1}=y_{r,k}+v_{r,k}\sin\theta_{r,k}dt+(y_k-y_{r,k})+(\theta_k-\theta_{r,k})v_{r,k}\cos\theta_{r,k}dt+(v_k-v_{r,k})\sin\theta_{r,k}dt=y_{r,k+1}+(y_k-y_{r,k})+(\theta_k-\theta_{r,k})v_{r,k}\cos\theta_{r,k}dt+(v_k-v_{r,k})\sin\theta_{r,k}dt \quad (16)$$

Following Formulas (17) to (21) are obtained from above Formulas (15) and (16).

[MATH. 17]

$$\tilde{x}_k=x_k-x_{r,k} \quad (17)$$

[MATH. 18]

$$\tilde{y}_k=y_k-y_{r,k} \quad (18)$$

[MATH. 19]

$$\tilde{\theta}_k=\theta_k-\theta_{r,k} \quad (19)$$

[MATH. 20]

$$x\tilde{x}_{k+1}=\tilde{x}_k-\tilde{\theta}_k v_{r,k}\sin\theta_{r,k}dt+\tilde{v}_k\cos\theta_{r,k}dt \quad (20)$$

[MATH. 21]

$$\tilde{y}_{k+1}=\tilde{y}_k+\tilde{\theta}_k v_{r,k}\cos\theta_{r,k}dt+\tilde{v}_k\sin\theta_{r,k}dt \quad (21)$$

In a case where a state is written down to k==n−1 (n is an integer) using k=0 as the initial state, following Formula (22) is obtained.

[MATH. 22]

$$\begin{bmatrix} \tilde{s}_1 \\ \tilde{s}_2 \\ \tilde{s}_3 \\ \vdots \\ \tilde{s}_n \end{bmatrix} = \begin{bmatrix} A_0 \\ A_1A_0 \\ A_2A_1A_0 \\ \vdots \\ \prod_{i=0}^{n-1} A_1 \end{bmatrix} \tilde{s}_0 + \begin{bmatrix} B_0 & 0 & \cdots & & 0 \\ A_1B_0 & B_1 & 0 & \cdots & 0 \\ A_2A_1B_0 & A_2B_1 & B_2 & \cdots & 0 \\ \vdots & \vdots & & \ddots & 0 \\ \prod_{i=0}^{n-1} A_1B_0 & \prod_{i=0}^{n-1} A_1B_1 & \cdots & A_{n-1}B_{n-2} & B_{n-1} \end{bmatrix} \begin{bmatrix} \tilde{u}_1 \\ \tilde{u}_2 \\ \tilde{u}_3 \\ \vdots \\ \tilde{u}_n \end{bmatrix} \quad (22)$$

Above Formula (22) can be regarded as following Formula (23).

[MATH. 23]

$$\tilde{X}=F\tilde{s}_0+G\tilde{U} \quad (23)$$

Here, an evaluation function J is defined as in following Formula (24),

[MATH. 24]

$$J=\tilde{X}^TQ\tilde{X}+\tilde{U}^TR\tilde{U} \quad (24)$$

In a case where above Formula (24) is rearranged for a speed command vector U, following Formula (25) is obtained.

[MATH. 25]

$$J(U)=\tfrac{1}{2}\tilde{U}^T(G^TQG+R)\tilde{U}+\{(F\tilde{s}_0)^TQG-U_r^TR\}\tilde{U} \quad (25)$$

Since Formula (25) is a quadratic form of the speed command vector U, the speed command vector U that minimizes the evaluation function J, that is, the speed command vector U that minimizes the square of an error of a position (x,y) is obtained by quadratic programming.

Figure 4:
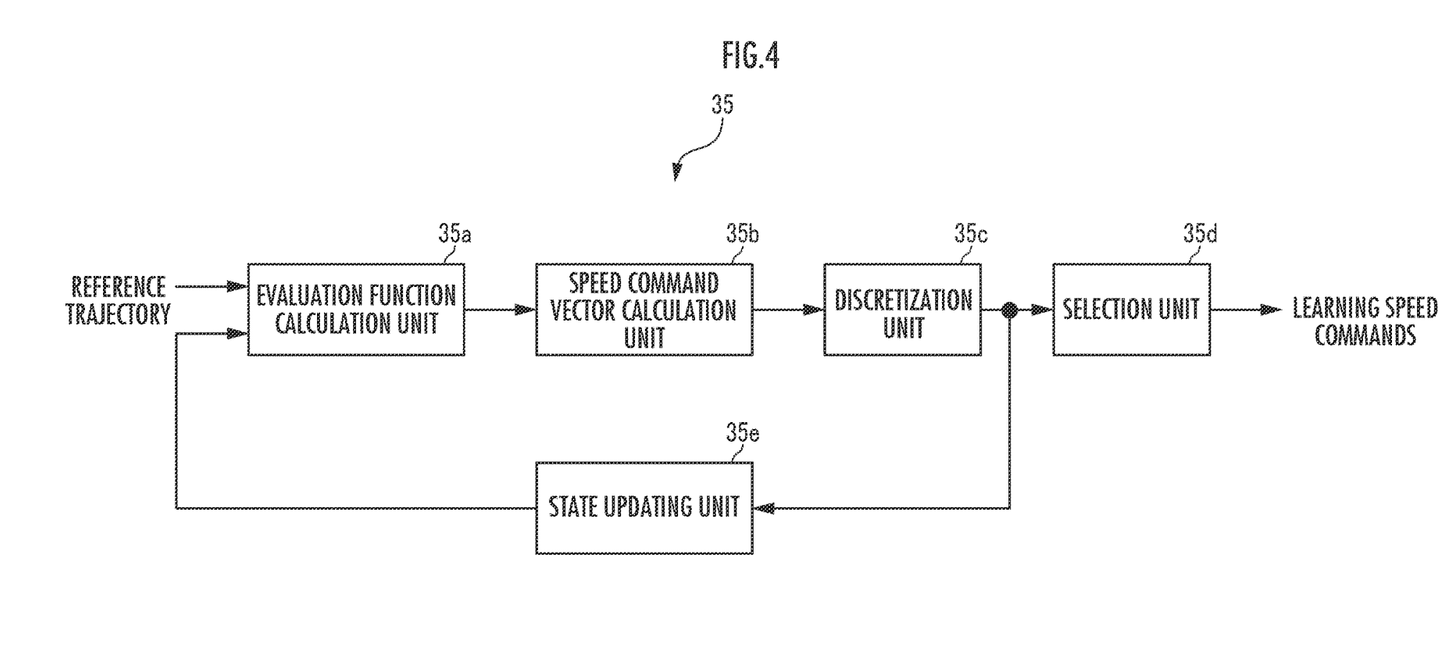
FIG. 4 is a block diagram illustrating a functional configuration of a learning data creation unit.

On the basis of the above principle, as illustrated in FIG. 4, the learning data creation unit 35 includes an evaluation function calculation unit 35a, a speed command vector calculation unit 35b, a discretization unit 35c, a selection unit 35d, and a state updating unit 35e as a configuration for calculating learning speed commands.

The evaluation function calculation unit 35a calculates the evaluation function J on the basis of the reference trajectory and the state amount vector s that has been updated by the state updating unit 35e. Then, the evaluation function J is output to the speed command vector calculation unit 35b.

In the speed command vector calculation unit 35b, the speed command vector U that minimizes the evaluation function J is calculated by convex optimization solver that is a type of quadratic programming, and the speed command vector U is output to the discretization unit 35c. Since an algorithm of the convex optimization solver is well known, the description thereof is omitted here.

Figure 10:
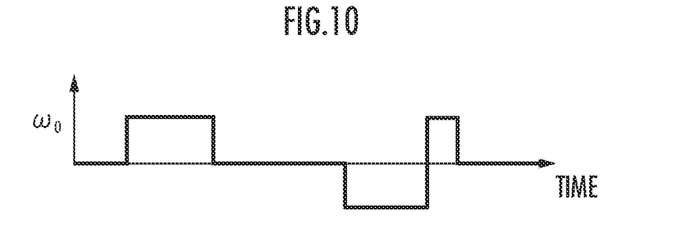
FIG. 10 is a diagram illustrating a discrete learning speed command.

Furthermore, the discretization unit 35c creates a discretized speed command vector Udis by discretizing the speed command vector U on the basis of speed commands $(u(v),u(\omega))$ and the acceleration limit of the robot 1. The discretized speed command vector Udis includes, as elements, values $u_{0\_dis}$ to $u_{n-1\_dis}$ obtained by discretizing elements $u_0$ to $u_{n-1}$ of the speed command vector U, and for example, a speed $\omega$ of the element $u_{0\_dis}$ is in a state illustrated in FIG. 10. Then, the discretized speed command vector Udis is output to the selection unit 35d and the state updating unit 35e.

In the selection unit 35d, the element $u_{0\_dis}$ is output as current learning speed commands from the elements $u_{0\_dis}$ to $u_{n-1\_dis}$ of the discretized speed command vector Udis. In this manner, the learning speed commands are calculated as a vector including the two speed commands $(u(v),u(\omega))$ as elements, in other words, a vector including two speeds v and $\omega$ as elements.

On the other hand, the state updating unit 35e updates the state amount vector s by the fourth-order Runge-Kutta method using the element $u_{0\_dis}$ of the discretized speed command vector Udis, thereby determining the state amount vector s for the following time, and outputting the state amount vector s to the evaluation function calculation unit 35a. The evaluation function calculation unit 35a calculates the following evaluation function J using the state amount vector s for the following time.

Returning to FIG. 3, as described above, the learning data creation unit 35 calculates a time series of the learning speed commands. Furthermore, as described above, in addition to the time series of the learning speed commands, a time series of each of the current speeds, the destination direction, and the mask image is created as learning data. Then, the learning data created as described above is input to the CNN learning unit 36.

Figure 3:
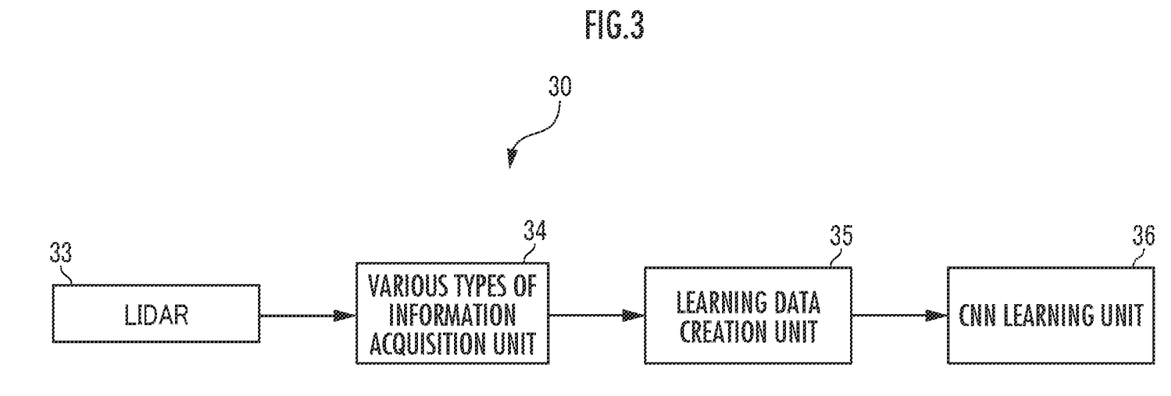
FIG. 3 is a block diagram illustrating a functional configuration of a learning device.

The CNN learning unit 36 learns the model parameters of the CNN using the learning data each time the learning data is input from a learning data creation unit 35. Specifically, when the mask image of the learning data is input to the CNN, output speed commands are calculated by the output of the CNN at that time, the destination direction, and the current speeds being connected using a fully connected layer. The output speed commands include a value having the same two speed commands $(u(v),u(\omega))$ as the learning speed commands as elements.

Next, the weight of the connected layer and the bias term of the CNN are calculated by the error back propagation method using a loss function of the learning speed commands and the output speed commands (for example, a cross entropy error). That is, learning calculation of the model parameters of the CNN is performed. Note that, in the present embodiment, the error back propagation method corresponds to a predetermined machine learning algorithm. Then, by the above learning calculation being performed a sufficient number of times (for example, several thousands of times), the learning calculation of the model parameters of the CNN in the CNN learning unit 36 is terminated. In the learning device 30 of the present embodiment, the learning of the model parameters of the CNN is performed as described above.

In a case of the robot 1 of the present embodiment, the CNN in which the model parameters have been learned as described above is stored in the E2PROM of the control device 10. As a result, when the robot 1 moves, the control device 10 creates the destination direction, the current speeds (vx,ωz), and the mask image as described above on the basis of the image signal of the camera 11, the measurement signal of the LIDAR 12, and the detection signal of the inertial measurement unit 13. Then, the speed commands are calculated by the data being input to the CNN in which the model parameters have been learned as described above, and the operating states of the actuators 4 and 4 are controlled on the basis of the speed commands. As a result, when moving in a crowd, the robot 1 moves while avoiding interference with people like pedestrians.

Figure 11:
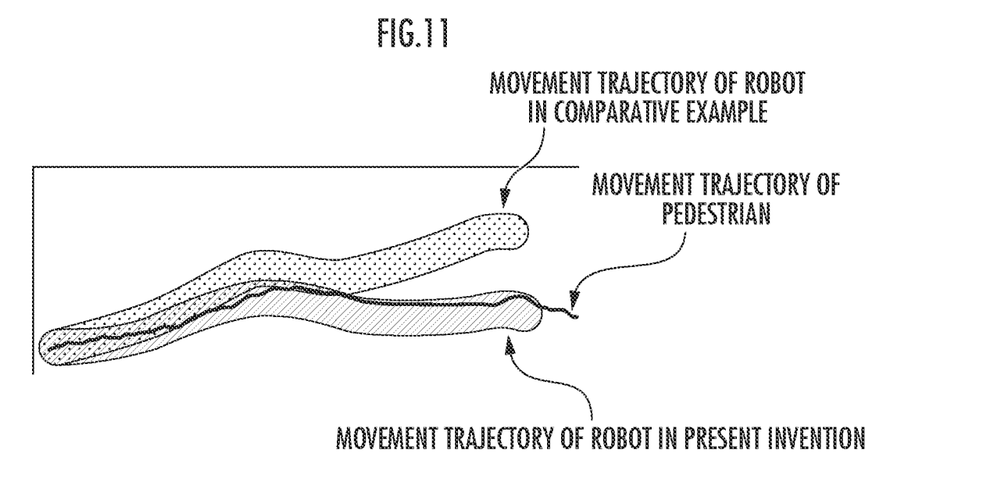
FIG. 11 is a diagram illustrating simulation results of a movement trajectory of a pedestrian and a movement trajectory of a robot.

Next, effects of the learning method of the present embodiment will be described with reference to FIGS. 11 and 12. In FIG. 11, a movement trajectory indicated by a solid line represents an example of a movement trajectory of a pedestrian. Furthermore, in FIG. 11, a movement trajectory indicated by hatching represents a simulation result example of a movement trajectory when the movement of the robot 1 is controlled using discretized speed commands (element $u_{0\_dis}$) obtained by discretizing by the discretization unit 35c of the embodiment as the speed commands (hereinafter the example is referred to as the "present invention example").

Furthermore, in FIG. 11, a movement trajectory indicated by stippling indicates, for comparison, a simulation result example of a movement trajectory when the movement of the robot 1 is controlled using a learning speed command indicated by a solid line in FIG. 12 (hereinafter the example is referred to as a "comparative example"). The learning speed command indicated by the solid line in FIG. 12 is obtained by omitting the discretization unit 35c in the above-described learning data creation unit 35, creating a learning speed command of a continuous value as indicated by a broken line in FIG. 12, and discretizing the learning speed command of the continuous value.

Figure 12:
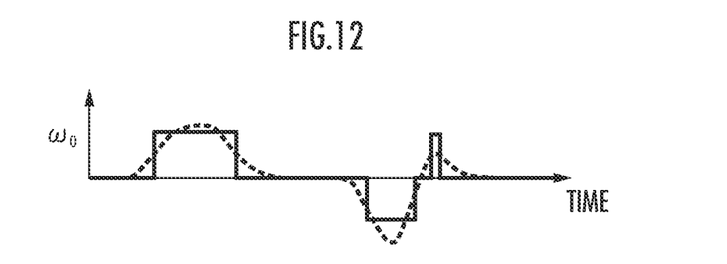
FIG. 12 is a diagram illustrating an example in which a learning speed command is discretized after being calculated as a continuous value.

The reason why the learning speed command indicated by the solid line in FIG. 12 is used is as follows. That is, in a case where a learning operation of the model parameters of the CNN is performed using the continuous value as teacher data, convergence of learning is deteriorated, and a state in which learning does not converge is likely to occur. Therefore, since there is a case where simulation of the movement trajectory using the CNN cannot be performed, in order to avoid this, in a case of the comparative example, a value obtained by discretizing the learning speed command of the continuous value is used.

In the case of this comparative example, it can be seen that the robot 1 cannot appropriately imitate the movement trajectory of the pedestrian while in a case of the present invention example, the robot 1 can appropriately imitate the movement trajectory of the pedestrian. That is, as in the embodiment, in the MPC, in a case where learning speed commands are calculated while updating the element $u_{0\_dis}$ of the discretized speed command vector Udis as the state amount vector s, it is found that the robot 1 can move while appropriately imitating the movement trajectory of the pedestrian as compared with a case of using the learning speed commands obtained by discretizing learning speed commands of a continuous value after calculating the learning speed commands of the continuous value.

Note that, although not illustrated, the applicant's experiment has confirmed an event in which the robot 1 moves without interfering with pedestrians when the CNN in which the model parameters have been learned by the learning method of the present embodiment is included in the robot 1 and the robot 1 moves on the same route in a crowd at movement speeds similar to those of the pedestrians.

As described above, according to the model parameter learning method of the present embodiment, in the learning data creation unit 35, a time series of learning speed commands of the robot 1 are calculated using the model prediction control algorithm based on the models [Formulas (1) to (5)] reflecting the movement constraints of the robot 1 such that a time series of a movement trajectory of the robot 1 tracks a time series of a movement trajectory of the second moving body acquired by the various types of information acquisition unit 34. More specifically, the speed command vector U that minimizes the evaluation function J of Formula (25) is calculated using the convex optimization solver, the discretized speed command vector Udis obtained by discretizing the speed command vector U is calculated, and the element $u_{0\_dis}$ of the discretized speed command vector Udis is calculated as the time series of the learning speed commands. Therefore, the learning speed commands can be calculated as speed commands that allow the robot 1 to move while appropriately imitating a movement trajectory of a pedestrian in the movement constraints of the robot 1.

Furthermore, in view of the operation characteristics of the robot 1, since the movement trajectory TR of the first pedestrian 5 that is considered not to satisfy the movement constraints of the robot 1 is not sampled, the various types of information acquisition unit 34 can calculate the time series of the learning speed commands of the robot 1 as appropriately satisfying the movement constraints of the robot 1.

Furthermore, the model parameters of the CNN are learned using such a time series of the learning speed commands of the robot 1 as teacher data. Specifically, the CNN model parameters in which the time series of the learning speed commands, a time series of a destination direction of the robot 1, a tune series of current speeds (vx,ωz), and a time series of a mask image are input and a time series of speed commands of the robot 1 is output are learned by the error back propagation method. At that time, since the learning speed commands that are discrete values are used as teacher data, convergence of learning can be improved as compared with a case where a continuous value is used as teacher data.

Note that the embodiment is an example in which the two-wheel-drive robot 1 is used as the first moving body, but the first moving body of the present invention is not limited thereto, and may have any movement constraints. For example, as the first moving body, a biped walking robot, a robot including three or more drive wheels, an automatic driving vehicle, or the like may be used.

Furthermore, the embodiment is an example in which a pedestrian is used as the second moving body, but the second moving body of the present invention is not limited thereto, and may have movement constraints different from that of the first moving body. For example, a biped walking robot, an animal, or the like may be used as the second moving body.

Furthermore, the embodiment is an example in which a mask image is used as surrounding environment information of the second moving body, but the surrounding environment information of the second moving body of the present invention is not limited thereto, and may be any information corresponding to the surrounding environment information of the second moving body. For example, a photographed image may be used as the surrounding environment information of the second moving body, and relative speeds (speeds and traveling direction) and a current position with respect to a moving body existing around the second moving body may be used as in Patent Literature 1.

Furthermore, the embodiment is an example in which the CNN is used as a learning model, but the learning model of the present invention is not limited thereto, and may be any learning model by which the model parameters can be learned using a predetermined machine learning algorithm. For example, as the learning model, a recurrent neural network (RNN), Deep Q-learning from Demonstrations (DQfD), or the like may be used, or a gradient boosting decision tree or the like may be used.

Note that the embodiment is an example in which the error back propagation method is used as the predetermined machine learning algorithm, but the predetermined machine learning algorithm of the present invention is not limited thereto, and may be any machine learning algorithm by which the model parameters of the learning model can be learned. For example, a support vector machine may be used as a predetermined machine learning algorithm.

Figure 13:
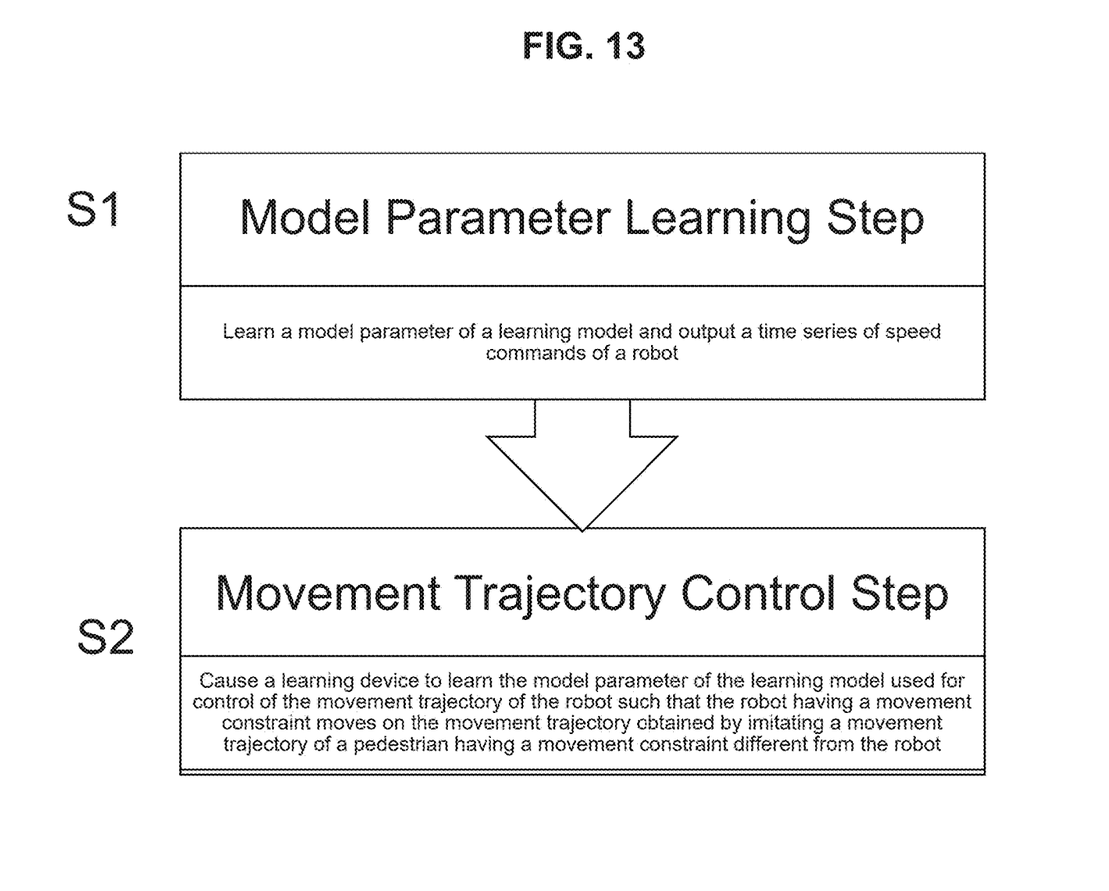
FIG. 13 is a flowchart showing a robot movement trajectory control method.
Figure 14:
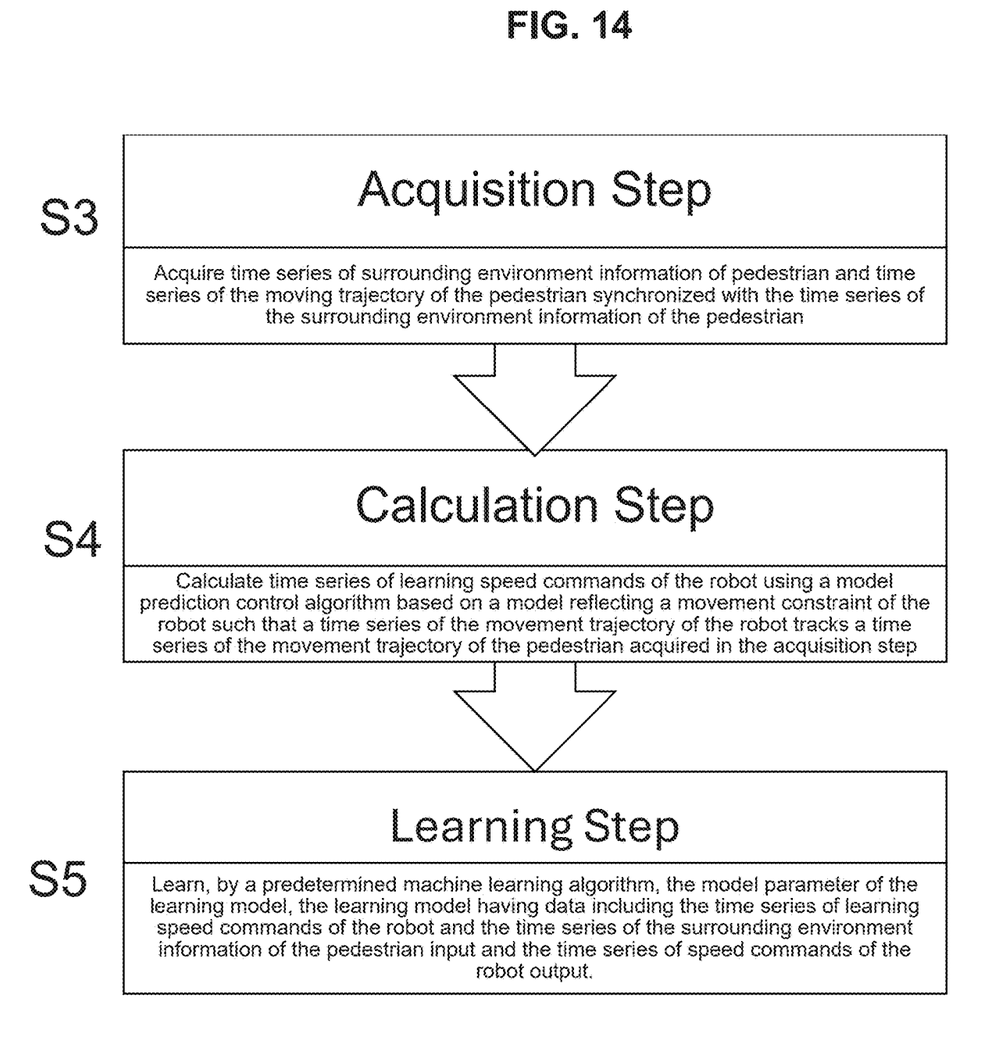
FIG. 14 is a flowchart showing a model parameter learning method of a model parameter learning step of the robot movement trajectory control method.

FIG. 13 shows a robot movement trajectory control method. The method includes a model parameter learning step S1 of learning a model parameter of a learning model and outputting a time series of speed commands of a robot, and a movement trajectory control step S2 of controlling a movement trajectory of the robot using the learning model and the time series of speed commands of the robot. FIG. 14 shows a model parameter learning method of the model parameter learning step, which includes: an acquisition step S3 of acquiring a time series of surrounding environment information of the pedestrian and a time series of the moving trajectory of the pedestrian synchronized with the time series of the surrounding environment information of the pedestrian; a calculation step S4 of calculating a time series of learning speed commands of the robot using a model prediction control algorithm based on a model reflecting a movement constraint of the robot such that a time series of the movement trajectory of the robot tracks a time series of the movement trajectory of the second moving body acquired in the acquisition step; and a learning step S5 of learning, by a predetermined machine learning algorithm, the model parameter of the learning model, the learning model having data including the time series of learning speed commands of the robot and the time series of the surrounding environment information of the pedestrian input and the time series of speed commands of the robot output.

REFERENCE SIGNS LIST

1 Robot (first moving body)
5 Pedestrian (second moving body)
30 Learning device
34 Various types of information acquisition unit (acquisition step)
35 Learning data creation unit (acquisition step and calculation step)
36 CNN learning unit (learning step)

TR Movement, trajectory of pedestrian (movement trajectory of second moving body)

$u_{0\_dis}$ Element of discretized speed command vector Udis (learning speed command)

The invention claimed is:

1. A robot movement trajectory control method comprising:
  - a model parameter learning step of learning a model parameter of a learning model and outputting a time series of speed commands of a robot; and
  - a movement trajectory control step of controlling a movement trajectory of the robot using the learning model and the time series of speed commands of the robot, wherein
  - the model parameter learning step causes a learning device to learn the model parameter of the learning model used for control of the movement trajectory of the robot such that the robot having a movement constraint moves on the movement trajectory obtained by imitating a movement trajectory of a pedestrian having a movement constraint different from the robot, the model parameter learning step comprising:
  - an acquisition step of acquiring a time series of surrounding environment information of the pedestrian and a time series of the moving trajectory of the pedestrian synchronized with the time series of the surrounding environment information of the pedestrian;
  - a calculation step of calculating a time series of learning speed commands of the robot using a model prediction control algorithm based on a model reflecting a movement constraint of the robot such that a time series of the movement trajectory of the robot tracks a time series of the movement trajectory of the pedestrian acquired in the acquisition step; and
  - a learning step of learning, by a predetermined machine learning algorithm, the model parameter of the learning model, the learning model having data including the time series of learning speed commands of the robot and the time series of the surrounding environment information of the pedestrian input and the time series of speed commands of the robot output.

2. The robot movement trajectory control method according to claim 1,
  wherein, in the calculation step, a time series of the learning speed commands of the robot is calculated as discrete values.

3. The robot movement trajectory control method according to claim 2,
  wherein, in the acquisition step, the movement trajectory of the pedestrian that is acquired in a state in which the movement trajectory of the pedestrian does not satisfy the movement constraint of the robot is deleted.

4. The robot movement trajectory control method according to claim 1,
  wherein, in the acquisition step, the movement trajectory of the pedestrian that is acquired in a state in which the movement trajectory of the pedestrian does not satisfy the movement constraint of the robot is deleted.

* * * * *